(12) United States Patent
Zhao et al.

(10) Patent No.: US 7,685,637 B2
(45) Date of Patent: Mar. 23, 2010

(54) SYSTEM SECURITY APPROACHES USING SUB-EXPRESSION AUTOMATA

(75) Inventors: Shi-Ming Zhao, Taipei (TW); Shih-Wei Chien, Taichung (TW)

(73) Assignee: Lionic Corporation, Hsinchu (TW)

( * ) Notice: Subject to any disclaimer, the term of this patent is extended or adjusted under 35 U.S.C. 154(b) by 1008 days.

(21) Appl. No.: 10/868,665

(22) Filed: Jun. 14, 2004

(65) Prior Publication Data

US 2005/0278781 A1  Dec. 15, 2005

(51) Int. Cl.
| | |
|---|---|
| G06F 7/04 | (2006.01) |
| G06F 17/30 | (2006.01) |
| H04L 9/32 | (2006.01) |
| G06F 11/00 | (2006.01) |
| G06F 12/14 | (2006.01) |
| G06F 12/16 | (2006.01) |
| G08B 23/00 | (2006.01) |
| H04N 7/16 | (2006.01) |
| B41K 3/38 | (2006.01) |

(52) U.S. Cl. ............................... 726/22; 726/2; 726/27; 380/59

(58) Field of Classification Search ................ 726/2–4, 726/16, 17, 21, 22, 26, 27; 380/59
See application file for complete search history.

(56) References Cited

U.S. PATENT DOCUMENTS

| | | |
|---|---|---|
| 5,319,776 A | 6/1994 | Hile |
| 5,414,833 A | 5/1995 | Hershey et al. |
| 5,623,600 A | 4/1997 | Ji |
| 5,978,801 A | 11/1999 | Yuasa |
| 5,982,891 A | 11/1999 | Ginter |
| 6,487,666 B1 * | 11/2002 | Shanklin et al. ............... 726/23 |
| 6,598,034 B1 | 7/2003 | Kloth |
| 6,609,205 B1 * | 8/2003 | Bernhard et al. ............. 726/22 |

(Continued)

FOREIGN PATENT DOCUMENTS

CA  2 307 529 A1  9/2001

(Continued)

OTHER PUBLICATIONS

James Moscola. et al. "Implementation of a Content-Scanning Module for an Internet Firewall", Field-Programmable Custom Computing Machines, FCCM 2003. Proceedings the 11th Annual IEEE Symposium on Apr. 9-11, 2003, Piscataway, NJ, USA, IEEE. XP010655273; ISBN 0-7695-1979-2.

(Continued)

*Primary Examiner*—Nasser G Moazzami
*Assistant Examiner*—Oscar A Louie
(74) *Attorney, Agent, or Firm*—Winston Hsu

(57) ABSTRACT

A method and system for ensuring system security is disclosed. The method and system split a regular expression that corresponds to a number of patterns into sub-expressions. The dependency relationships among the finite automata that correspond to the sub-expressions are maintained. Then, as data units are put through these finite automata in a sequence that is based on the dependency relationships, suspected data units are identified. The suspected data units are the ones containing content that collectively matches one or more of the aforementioned patterns. Identification of the suspected data units is based on the merged results of the finite automata. Depending on the result of identifying the suspected data units, different actions are performed.

46 Claims, 11 Drawing Sheets

U.S. PATENT DOCUMENTS

| | | | |
|---|---|---|---|
| 6,792,546 | B1 | 9/2004 | Shanklin et al. |
| 6,880,087 | B1* | 4/2005 | Carter .................. 726/23 |
| 7,180,895 | B2* | 2/2007 | Smith .................. 370/394 |
| 7,185,081 | B1* | 2/2007 | Liao .................. 709/224 |
| 2002/0073330 | A1 | 6/2002 | Chandnani |
| 2002/0124187 | A1* | 9/2002 | Lyle et al. .................. 713/201 |
| 2003/0004689 | A1* | 1/2003 | Gupta et al. .................. 702/188 |
| 2003/0051043 | A1* | 3/2003 | Wyschogrod et al. ....... 709/230 |
| 2003/0123447 | A1 | 7/2003 | Smith |
| 2003/0221013 | A1* | 11/2003 | Lockwood et al. .......... 709/231 |
| 2004/0105298 | A1 | 6/2004 | Symes |
| 2005/0278781 | A1 | 12/2005 | Zhao |
| 2005/0278783 | A1 | 12/2005 | Chien et al. |
| 2006/0005241 | A1 | 1/2006 | Zhao et al. |

FOREIGN PATENT DOCUMENTS

| | | | |
|---|---|---|---|
| GB | 2 417 655 | A | 3/2006 |
| WO | WO 2004/079571 | A2 | 9/2004 |

OTHER PUBLICATIONS

Aho, Sethi, Ullman. "Compilers", 1986, SEC 3.7, pp. 121-128. XP002381613.

C. Scott Ananian. "JLex: A Lexical Analyzer Generator for Java(TM)", version 1.2.6, Feb. 7, 2003, p. 1-2, Internet. XP002382680.

Reetinder Sidhu. et al, "Fast Regular Expression Matching using FPGAs" Field-Programmable Custom Computing Machines, 2001. FCCM'01. The 9th annual IEEE Symposium on rohaert park, CA, USA, Apr. 29, 2001, paragraph 02.4. XP010789123; ISBN 0-7695-2667-5.

Christopher R. Clark et al, "A pattern-matching co-processor for network intrusion detection systems" Field-Programmable Technology (FPT), Proceedings 2003 IEEE International Conference on Dec. 15-17, 2003. Piscataway, NJ, USA, IEEE, pp. 68-74. XP010688321; ISBN 0-7803-8320-6.

Elliot Berk, JLex:A lexical analyzer generator for Java(TM), Sep. 6, 2000, http://www.cs.pitt.edu/~mock/cs2210/handouts/jlex-manual.pdf.

* cited by examiner

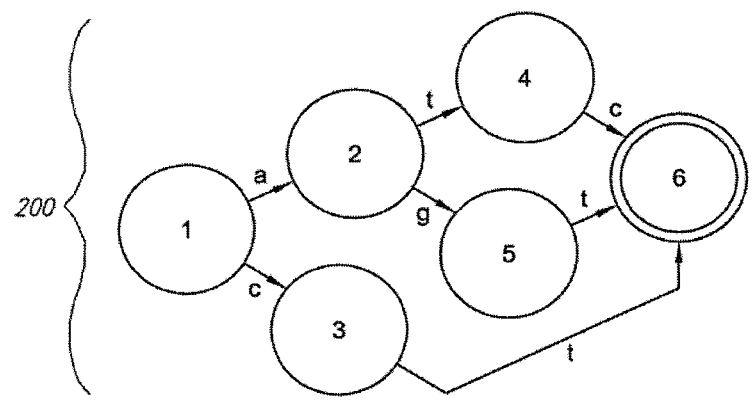
*FIG. 2A*
|   | A | C | T | G |
|---|---|---|---|---|
| 1 | 2 | 3 | 0 | 0 |
| 2 | 0 | 0 | 4 | 5 |
| 3 | 0 | 0 | 6 | 0 |
| 4 | 0 | 6 | 0 | 0 |
| 5 | 0 | 0 | 6 | 0 |
| 6 | 0 | 0 | 0 | 0 |
*FIG. 2B*
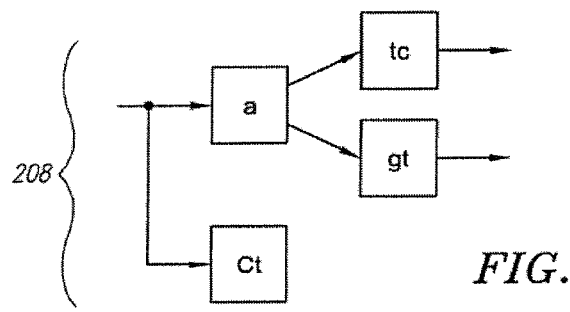
*FIG. 2C*

SYSTEM SECURITY APPROACHES USING SUB-EXPRESSION AUTOMATA

FIELD

This patent document generally relates to system security approaches, especially methods and systems relating to preventive measures in response to attacks to a device on a network.

BACKGROUND

Unless otherwise indicated herein, the approaches described in this section are not prior art to the claims in this application and are not admitted to be prior art by inclusion in this section.

As computer networks become ubiquitous, any device that is connected to the networks is susceptible to debilitating attacks, such as viruses, worms, and cracker attacks. Typical approaches to counter these attacks include firewall techniques and anti-virus programs. Firewalls generally prevent certain types of files or packets from entering a network, and anti-virus programs typically prevent files that contain virus patterns from being executed on a device or a group of devices.

Several types of firewall techniques exist today. Some examples include packet filter, application gateway, and proxy server. The packet filter approach inspects the control information of each packet and determines whether to accept or reject the packet based on user-defined rules. The application gateway approach applies a security mechanism to certain applications, such as File Transfer Protocol (FTP) and Telnet servers. The proxy server approach utilizes an in-between server to intercept and inspect packets between a client application and a server on a network to which the client application submits requests to. None of these existing techniques inspects the payload data portion of each packet or handles malicious code segments that spread across packet boundaries.

An anti-virus program that executes on a device generally assembles incoming packets received by the device into a file before determining whether the assembled file includes certain predetermined virus patterns. In such approaches, no inspection takes place until after a file or a block of data has been assembled. For attacks that target real-time protocols, the timing requirements of the protocols would render the aforementioned assembling-before-scanning approaches essentially inoperable.

BRIEF DESCRIPTION OF THE DRAWINGS

FIG. 2A is a state transition diagram that illustrates a deterministic finite automaton;

FIG. 2B illustrates one embodiment of a state table that represents a deterministic finite automaton;

FIG. 2C is a block diagram of one simplified representation of an example deterministic finite automaton, such as the one shown in FIG. 2A.

DETAILED DESCRIPTION

System security approaches are described. In the following description, for the purposes of explanation, numerous specific details are set forth in order to provide a thorough understanding of the present invention. It will be apparent, however, to one skilled in the art that the present invention may be practiced without these specific details.

The general theories behind "regular expression," "state machine," and "automaton" are well known in the art and will not be elaborated in detail. However, throughout this disclosure, "state machine" is used interchangeably with "state automaton". "Wild card" generally refers to special symbols, such as a combination of the period and the asterisk (.*), that stand for zero, one, or more characters (e.g., ".*abc" refers to all patterns that end with "abc"). Each "data unit" generally refers to data that are stored in a particular memory location or a packet with a destination address. "Stack" generally refers to a block of memory locations that are used for temporary storage.

1.0 General Overview

The system security approaches as discussed below include methods and systems that split a regular expression that corresponds to a number of patterns into sub-expressions. The dependency relationships among the finite automata that correspond to the sub-expressions are maintained. Then, as data units are put through these finite automata in a sequence that is based on the dependency relationships, suspected data units are identified. The suspected data units are the ones containing content that collectively matches one or more of the aforementioned patterns. Identification of the suspected data units is based on the merged results of the finite automata. Depending on the result of identifying the suspected data units, different actions are performed.

2.0 System Security Approaches

2.1 Overview

An overview of system security approaches is now provided. To "secure" a system, one approach is to examine data units that enter into and depart from the system to ensure that the system is freed from invasion of unwanted codes and unauthorized accesses. The approach is based in part on the use of regular expressions, which generally refer to sets of symbols and syntactic elements used to represent certain patterns. For example, a simple regular expression, such as (a|b)t, represents the patterns "at" and "bt". Although a well-crafted regular expression may appear concise, especially with the use of wild cards, the expression may represent many patterns and result in a state machine with many states.

One system security approach is also based in part on managing and manipulating the states in various state automata that are derived from the regular expressions to effectively search and match certain patterns. As more and more patterns are identified as unwanted patterns, additional steps are also needed to accelerate the searching and matching of various patterns while lessening storage requirements.

Figure 1:
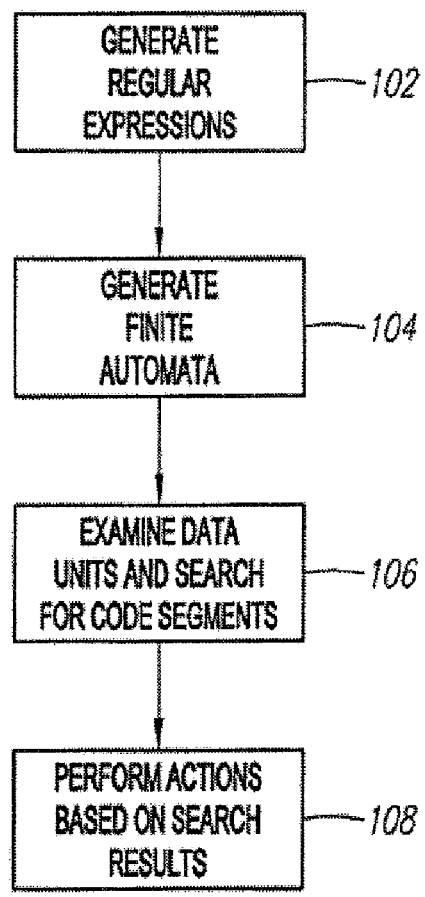
FIG. 1 is a flow diagram of an example of a system security approach.

FIG. 1 is a flow diagram of one system security approach. In block 102, unwanted patterns that have been previously identified, such as, without limitation, known viruses, worms, spam, illegal accesses, or any malicious codes that can be translated to regular expressions are translated. These unwanted patterns can also be sound patterns, image patterns, or any other non-text based patterns, as long as they can be translated to regular expressions.

In block 104, finite automata are generated according to the regular expressions. In one embodiment, the finite automata are deterministic, where for each state in the automata there is at most one transition for each possible input. Moreover, the relationships and dependencies among the automata are established and manipulated in block 104. Subsequent sections will further describe a deterministic finite automaton ("DFA") and the establishment and manipulation of the automata.

Moreover, in one implementation, relevant state information is stored in state tables to represent the automata and the dependencies. To reduce the size of the state tables and as a result reduce the storage requirements for such tables, one approach is to further compress the state information. Subsequent sections will further elaborate on the details of the compression method and the resulting structures of the state tables.

In block 106, as incoming data units are received, the content of the data units, regardless of the type of the content (e.g., the content can be control information or data information), is compared with the patterns that are represented by the automata and the corresponding relationships among them. In one embodiment, the content of each data unit may include "code segments" of each pattern. For example, if the pattern is "abcxyz," the code segments can be "abc" and "xyz" and reside in two contiguously received data units. These two data units are considered to be "suspected data units." Alternatively, for the same pattern, the code segments can be "abc," "x," "yz" and reside in three contiguously received data units. These three data units are considered to be suspected data units.

On the other hand, if the pattern is instead "abc.*xyz," the code segments can still be "abc" and "xyz" but can reside in any two data units as long as the data unit containing "abc" is received before the data unit containing "xyz." As an illustration, a "match" with the pattern "abc.*xyz" is reached if the following three data units are received contiguously: the first data unit contains "abc," the second data unit does not contain any of the "abcxyz" characters, and the third data unit contains "xyz". In other words, because of the wild card in the pattern, as long as each character of the pattern is found in the three data units, even if the first data unit is not followed by the third data unit, the comparison result is still considered as a match.

On the other hand, if the following three data units are received contiguously: the first data unit contains "abc," and neither the second nor the third data unit contains any of the "abcxyz" characters, the first data unit is still considered to be a suspected data unit and is retained until "xyz" characters appear in a subsequently received data unit. Alternatively, instead retaining the data unit itself, the comparison result is retained. For instance, after the first data unit is determined to contain "abc," the first data unit itself is not retained, but a status flag that corresponds to the first data unit is set. Then, when a subsequent data unit is determined to contain "xyz," the status flag may be reset, and an action is performed in response to the matching of the full "abc.*xyz" pattern. In one implementation, there may be a limit as to the length of time to retain either a suspected data unit or the comparison information relating to the suspected data unit. Subsequent sections will elaborate further on the comparison mechanism.

In block 108, depending on the outcome of the comparison, certain actions are performed. Some examples of the actions include, without limitation, preventing certain data units from entering or leaving a system, alerting or notifying users of the system of the outcome, generating a log, and modifying the data of the identified data units.

2.2 Automata and State Tables

FIG. 2A is a state transition diagram that illustrates one DFA 200. The regular expression of DFA 200 is (a(tc|gt))| (ct)). DFA 200 has {1, 2, 3, 4, 5, 6} as its states, {a, c, t, g} as its characters, {1} as the initial state, and {6} as the final state. DFA 200 also has a transition function, where δ(initial state, input character)=next state. More specifically, δ(1, a)=2, δ(2, t)=4, δ(4, c)=6, δ(2, g)=5, δ(5, t)=6, δ(1, c)=3, and δ(3, t)=6. The patterns that are represented by DFA 200 are {ct, atc, agt}.

FIG. 2B illustrates one embodiment of a state table 202 that represents DFA 200. State table 202 consists of N rows of M next states, where N represents the number of states in an automaton, and M represents the size of the character set. In other words, N and M for DFA 200 are 6 and 4, respectively. The information stored in cell 204 as shown in FIG. 2B corresponds to δ(1, a)=2. The zero at cell 206 or any other cells indicates that with the initial state {1} and the input {t}, the transition function δ of DFA 200 does not provide a next state.

In one implementation, each cell of state table 202 corresponds to a memory location. For example, suppose each cell of state table 202 contains 8-bit data; the first row starts at a base memory address of x; each column indicates a relative position of a character, such as {a}, in each row; and the entire state table 202 is stored in contiguous memory locations. If the relative position of {a} in row 1 of state table 202 is 1, then cell 204 corresponds to memory location (x+(row number−1)*8 bits). In other words, the total memory requirement for storing state table 202 is then (N*M*data size) or (6*4*8). The aforementioned implementation is one of many ways to store state table 202 in memory.

For illustration purposes, subsequent sections occasionally use simplified representations of automata. FIG. 2c is a block diagram of one simplified representation of DFA 200. Although simplified DFA 208 does not show all the necessary information to describe the transition function, δ(initial state, input character), it shows the sequence of characters that the DFA accepts. This simplified representation of a DFA is used as a building block to illustrate complex DFAs in subsequent discussions.

Figure 3:
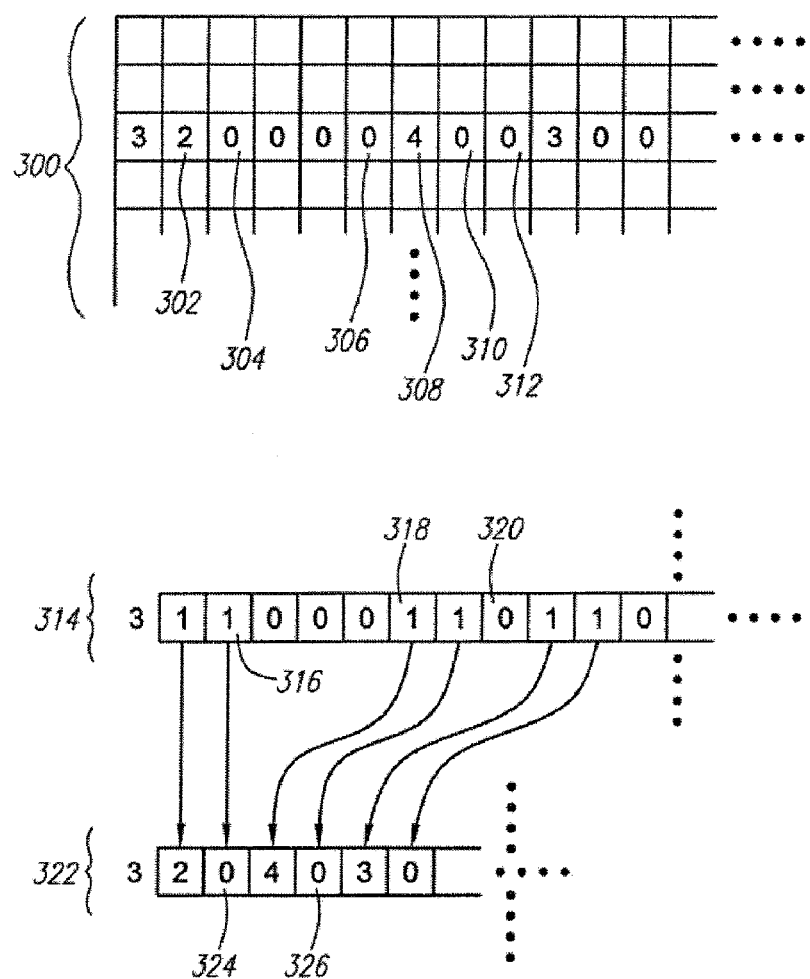
FIG. 3 illustrates one embodiment of compressing a state table that represents an automaton.

As discussed above, as a finite automaton, such as DFA 200, is generated and its corresponding state table, such as state table 202, is established in block 104, in one implementation, the state table is further manipulated in block 104 before proceeding to the data unit examination phase of block 106. FIG. 3 illustrates one embodiment of compressing a state table that represents an automaton. As illustrated, row 3 of another state table, state table 300, has several zeros. Bit map table 314 is generated to mark variations between adjacent cells of state table 300. For example, using the third rows of state table 300 and bit map table 314 as examples, because the state information in cell 302 varies from the information in cell 304, this variation is noted in cell 316 of bit map table 314. Similarly, because the state information in cell 306 differs from the information in cell 308, the corresponding cell 318 of bit map table 314 is marked "1". On the other hand, because the state information in cell 310 and cell 312 is the same, the corresponding cell 320 contains zero.

After the variations between adjacent cells have been noted, a compressed state table 322 is generated. In one embodiment, based on all the cells that contain "1" in bit map table 314, such as cells 316 and 318 in the third row of bit map table 314, the state information in the corresponding cells of state table 300 are recorded in the third row of compressed table 322. For instance, because cell 316 contains "1" and corresponds to cell 304 of state table 300, the state information, "0," that cell 302 contains is recorded in cell 324 of compressed row 322. As a result of the compression as discussed above, the size of state table 300 is greatly reduced.

Figure 4:
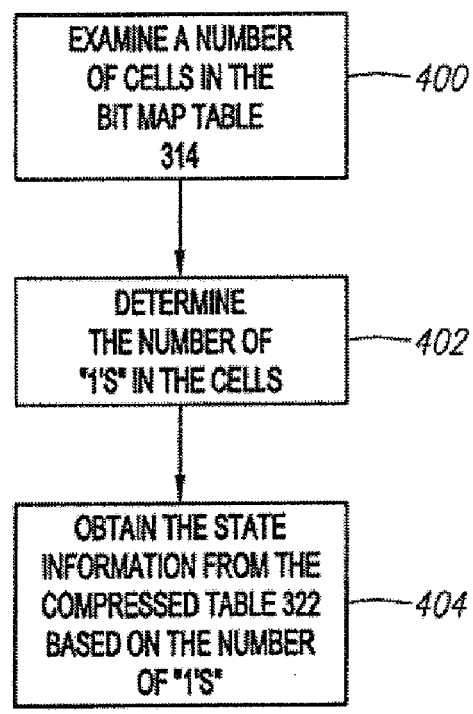
FIG. 4 illustrates one approach of retrieving state information from a compressed state table.

FIG. 4 illustrates one approach of retrieving state information from a compressed state table. Using the tables in FIG. 3 as examples, suppose the state information in the seventh position (counting from left to right) of the third row of state table 300, or cell 310, is needed. In block 400, the first seven cells (again from left to right) of the third row of bit map table 314 are analyzed. Specifically, one approach is to determine the number of "1's" in the seven cells in block 402. In this scenario, there are four "1's". In block 404, based on these four ones, cell 326 of compressed table 322 is identified (i.e., fourth cell from left to right), and the content of cell 326, "0," is retrieved. Similarly, if the state information in the sixth position of the third row of state table 300, or cell 308, is needed, six cells are examined in block 400. Because there are three ones in the six cells, the content of the third cell from left to right in compressed table 322, "4," is retrieved in block 404.

2.3 Manipulation of Automata

Figures 5A, 5B:
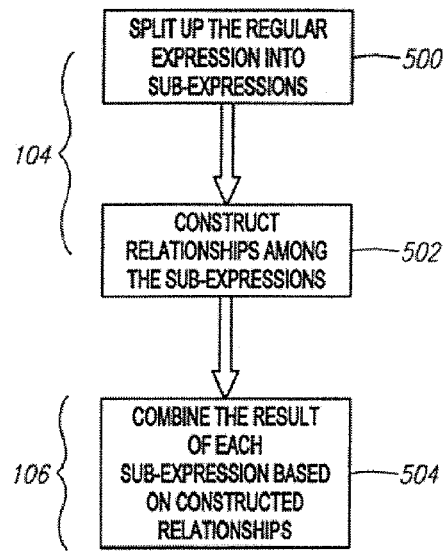
FIG. 5A illustrates one general approach of manipulating an automaton.
FIG. 5B illustrates one approach of splitting a regular expression into multiple sub-expressions and correlating the multiple automata of the sub-expressions.

FIG. 5A illustrates one general approach of manipulating an automaton. In block 500, the regular expression of the automaton is split up into sub-expressions. Then, the relationships among these sub-expressions are constructed in block 502. After the data units are examined and searched according to the automata that correspond to the sub-expressions, the results are combined according to the constructed relationships mentioned above in block 504. In one embodiment, the processes of blocks 500 and 502 are performed as part of block 104 shown in FIG. 1, and the processes of block 504 are performed as part of block 106.

FIG. 5B illustrates one approach of splitting a regular expression into multiple sub-expressions and correlating the multiple automata of the sub-expressions. As an example, suppose RE1, (.*)(RE2), and (.*)(RE3) are three distinct regular sub-expressions of an overall regular expression, (RE1)(.*)(RE2)(.*)(RE3). Instead of directly obtaining a single automaton that represents the regular expression, one approach is to obtain the automaton of each sub-expression and develop dependencies among the sub-expression automata.

More specifically, DFA 506 in FIG. 5 represents sub-expression RE1. DFA508 represents (.*)(RE2), and DFA510 represents (.*)(RE3). One embodiment of establishing dependencies among these three DFAs is to use additional information, such as the type of state information. The type of state information indicates whether the state is a sub-expression initial state, such as 512, a sub-expression final state, such as 514, or a real final state, such as 516. Thus, when data units are examined in block 106 as shown in FIG. 1, the data units are put through DFAs of sub-expressions, such as 506, 508, and 510, and not the one DFA of the entire regular expression and still reach the same results.

Figure 6:
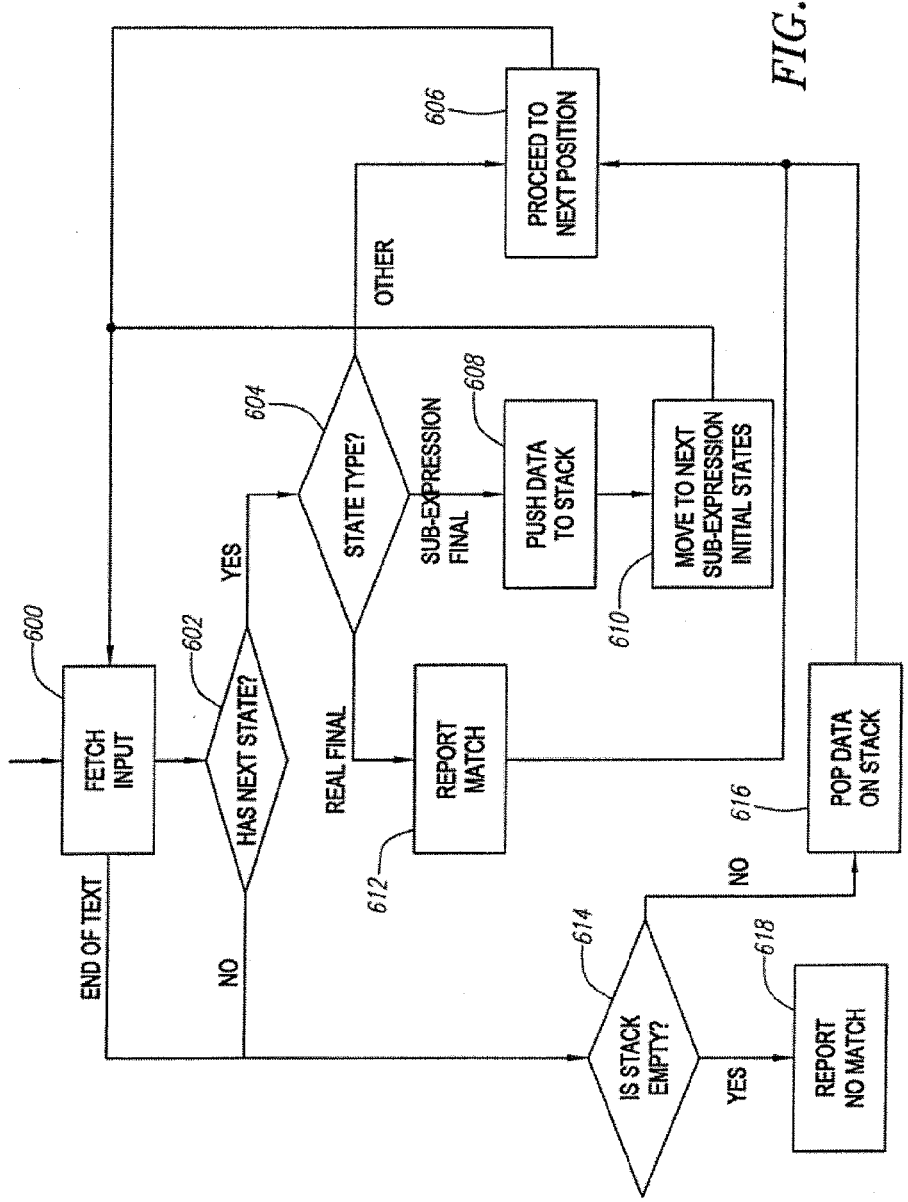
FIG. 6 is a flow chart of one process that makes use of the type of state information to correlate multiple automata of sub-expressions.

FIG. 6 is a flow chart of one process that makes use of the type of state information to correlate multiple automata of sub-expressions. For illustration purposes, suppose DFA 506 is the same as DFA 200 in FIG. 2A, and the state "5" in DFA 200 is marked as sub-expression final state 514 of DFA 506. If data units are put through the DFAs in FIG. 5 in block 106 of FIG. 1, the data units are retrieved in block 600. The content of the data units is compared to the characters, such as {a, c, t, g} of DFA 200. If a character is matched, such as {a}, block 602 yields a positive response and proceeds to ascertain the type of the "next state," or state "2" of DFA 200. Because state "2" is neither a sub-expression final state nor a real final state, the process proceeds to the next position of the data units' content in block 606.

However, if any of the patterns "atc," "agt," or "ac" has been matched and the next state is state "5" of DFA 200, because state "5" is a sub-expression final state, the result of block 604 is to push the data units on a stack in block 608 for subsequent processing with other sub-expression automata. Specifically, in block 610, the initial sub-expression state of DFA 508 is retrieved to process the remaining content of the data units. In one implementation, the "remaining" content starts at a position of the data units' content after a "matching position," where the content at the matching position results in the transition to the sub-expression final state.

If the next state indicates that it is a real final state, a match is reported in block 612. At this point, the data units have gone through all the sub-expression automata and have been determined to collectively contain patterns that are presented by the full regular expression. To illustrate "collectively containing," suppose a regular expression represents the pattern, "abc.*xyz," and three data units "collectively contain" the pattern. In one implementation, the content of the data units includes each character of the "abcxyz," and the characters follow the particular sequence of the pattern. For example, the first data unit may include "abc," the second data unit may include "xy," and the third data unit may include "z". In another example, because of the wild card in the pattern, the first data unit may contain "abcabcabc," the second data unit may contain "defmnoxy," and the third data unit may contain "zijk". Both of the aforementioned data unit sets collectively contain the pattern. If all the data that are on the stack have been examined through blocks 614 and 616 and neither contain the characters of the patterns nor follow the sequences of the patterns, no match is reported in block 618.

Figure 7:
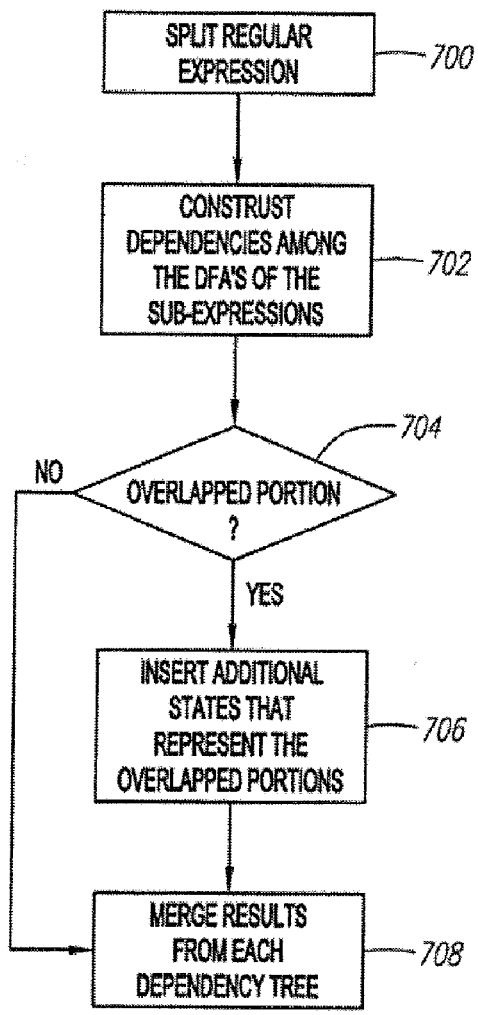
FIG. 7 is a flow chart of another approach of splitting a regular expression into multiple sub-expressions and merging the multiple automata of the sub-expressions.

FIG. 7 is a flow chart of yet another approach of splitting a regular expression into multiple sub-expressions and merging the multiple automata of the sub-expressions. As an example, for an overall regular expression, (RE1.*RE2.*RE4)|(RE1.*RE3.*RE5), one embodiment splits the regular expression into two sub-expressions in block 700, (RE1.*RE2.*RE4) and (RE1.*RE3.*RE5). Before proceeding to further process the automata of these two sub-expressions, the dependencies among the automata of RE1, RE2, and RE4, and RE1, RE3, and RE5 are constructed in block 702.

In block 704, overlapped portions between adjacent sub-expression automata are identified. With the identified overlapped portions, some additional states that represent the overlapped portions are inserted into the constructed dependencies among the automata in block 706. The overlapped portions result from one embodiment of performing a union operation in block 708. A union operation, which is represented by the symbol "|," between two sets of data returns a set of elements that are a member of either or both of the two sets. Continuing with the aforementioned regular expression, (RE1.*RE2.*RE4)|(RE1.*RE3.*RE5) as an example, one merged result in block 708 would be (RE1|RE2|RE4)|(RE1|RE3|RE5) plus any of the states that have been inserted in block 706.

Figure 8:
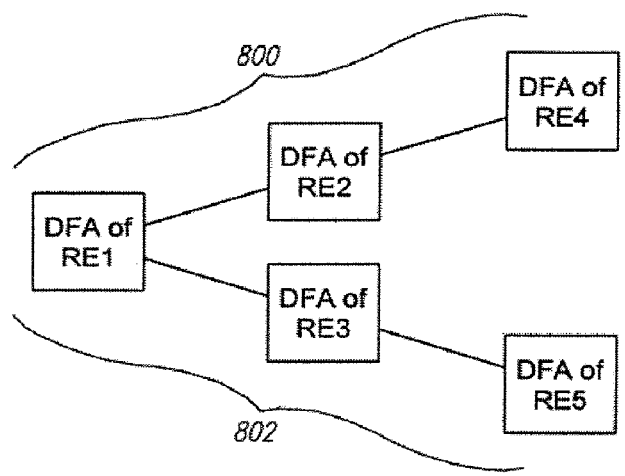
FIG. 8 is an example of a dependency tree.

To further illustrate the dependency construction of block 702, as shown in FIG. 8, dependency trees 800 and 802 are constructed to track the dependency relationships among the automata of RE1, RE2, RE3, RE4, and RE5. Each dependency tree indicates an operating sequence of the automata that represent the sub-expressions. In one implementation, the examination and search operation of block 106 in FIG. 1 follows the sequences of dependency tree 800 and dependency tree 802. It should be noted that a group of at least two dependency trees is collectively referred to as a "dependency forest".

In block 704, the sub-expressions that are represented by adjacent automata are examined to determine whether overlapped portions exist. An "overlapped" portion generally refers to the common and consecutive-in-sequence characters of the patterns that two adjacent automata represent. Two automata are "adjacent," when one automaton follows another in a dependency tree, such as DFA of RE2 following DFA of RE1 in FIG. 8. For example, suppose RE1 is "cebcbcbc," and RE2 is ".* cbcbcd". The overlapped portion is therefore "cbcbc". On the other hand, if RE1 is "cebcbcbc," but RE2 is ".* cbcbcde," even though "e" is common between RE1 and RE2, the overlapped portion is still "cbcbc".

Figure 9:
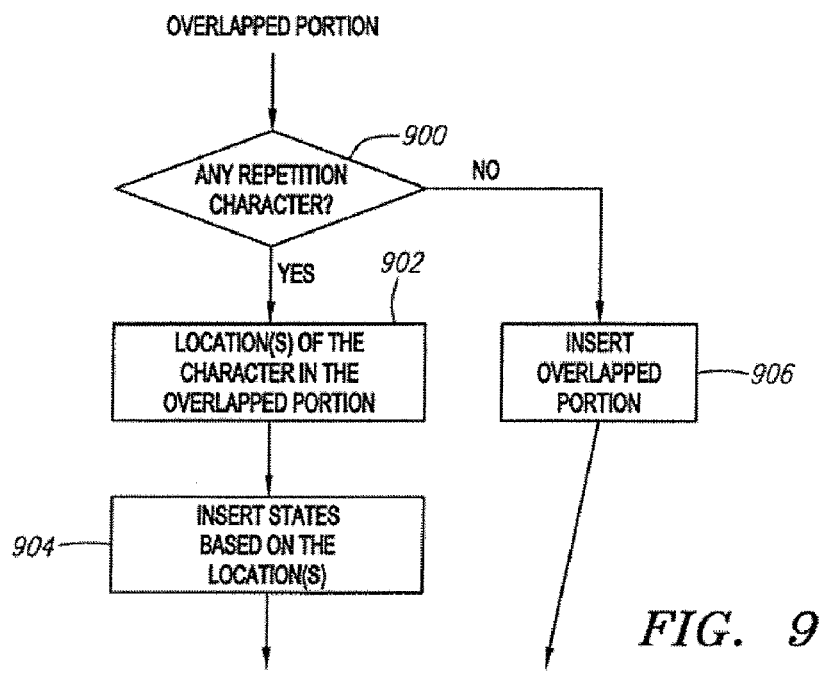
FIG. 9 is a flow chart of one process of inserting the additional states.
Figure 10A:
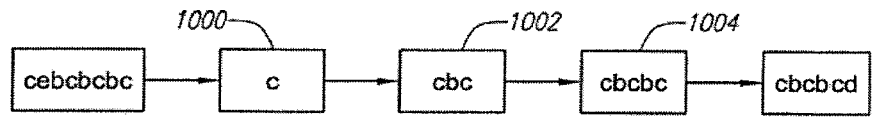
FIG. 10A is a simplified DFA that represents the result of inserting states.

If any overlapped portion exists, additional states are inserted between the two adjacent automata, such as the DFA of RE1 and DFA of RE2, in block 706. FIG. 9 is a flow chart of one process of inserting the additional states. Using RE1="cebcbcbc" and RE2=".* cbcbcd" as examples, the overlapped portion, as discussed above, is thus "cbcbc". The repetitive character, "c," is identified in block 900, and its position in the overlapped portion is determined in block 902. In particular, counting in the direction from the least significant bit (or right to left) to the most significant bit, "c" occurs in bit positions 1, 3, and 5 of the overlapped portion "cbcbc". With the bit positions, additional states are inserted in block 904. FIG. 10A is a simplified DFA that represents the result of inserting states. The inserted states 1000, 1002, and 1004 correspond to the least significant 1 bit, 3 bits, and 5 bits of the overlapped portion, respectively.

Figure 10B:
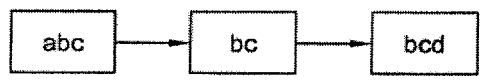
FIG. 10B is a simplified DFA that represents the result of inserting "bc"

However, if the overlapped portion does not include repetitive characters, only the overlapped portion is inserted as an additional state in block 906. As an illustration, if RE1="abc," and RE2="bcd," the overlapped portion is "bc". FIG. 10B is a simplified DFA that represents the result of inserting "bc".

Figure 11:
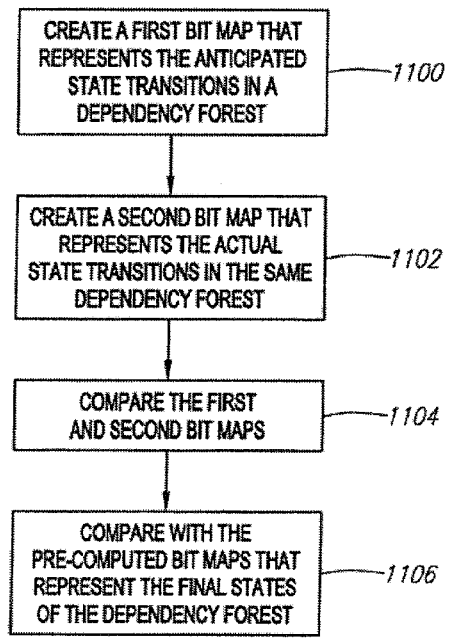
FIG. 11 illustrates one process of using binary bits to obtain a merged result of a dependency forest of automata.

In block 708 as shown in FIG. 7, the results from each dependency tree are merged. As discussed above, the merge operation can be a union operation. In one implementation, the results are represented by binary bits and are merged using logical AND or OR operations. FIG. 11 illustrates one process of using binary bits to obtain a merged result of a dependency forest of automata. In block 1100, a bit map is generated to represent the anticipated state transitions in a dependency forest. Using the dependency forest as shown in FIG. 8 as an example, if the DFAs of RE1 and RE2 have already yielded matches with the content of incoming data units, a first bit map is generated to represent the anticipated state transitions, such as from RE2 to RE4 and from RE1 to RE3.

When actual matches between the content of the data units and the automata in the dependency forest occur, a second bit map is generated in block 1102 to reflect the actual state transitions. For instance, if and when the transition from RE1 to RE3 occurs, the second bit map is generated to reflect the transition. In one embodiment, a bitwise logical AND operation is performed between the first bit map and the second bit map in block 1104 to capture the state transitions. Since the final DFAs of dependency trees 800 and 802 are DFAs of RE4 and RE5, respectively, in one embodiment, another bitwise logical AND operation is performed between the bit map that reflects the latest state transitions and the bit map that represents RE4 and RE5 in block 1106. This result of block 1106 can be optionally fed back to formulate bit maps that anticipate other state transitions in the dependency forest.

Although the various figures and the discussions generally focus on splitting of one regular expression and manipulating the sub-expressions of that one regular expression, the discussed approaches are generally applicable to splitting multiple regular expressions and correlating the corresponding sub-expressions.

3.0 Example System Structure

Figure 12:
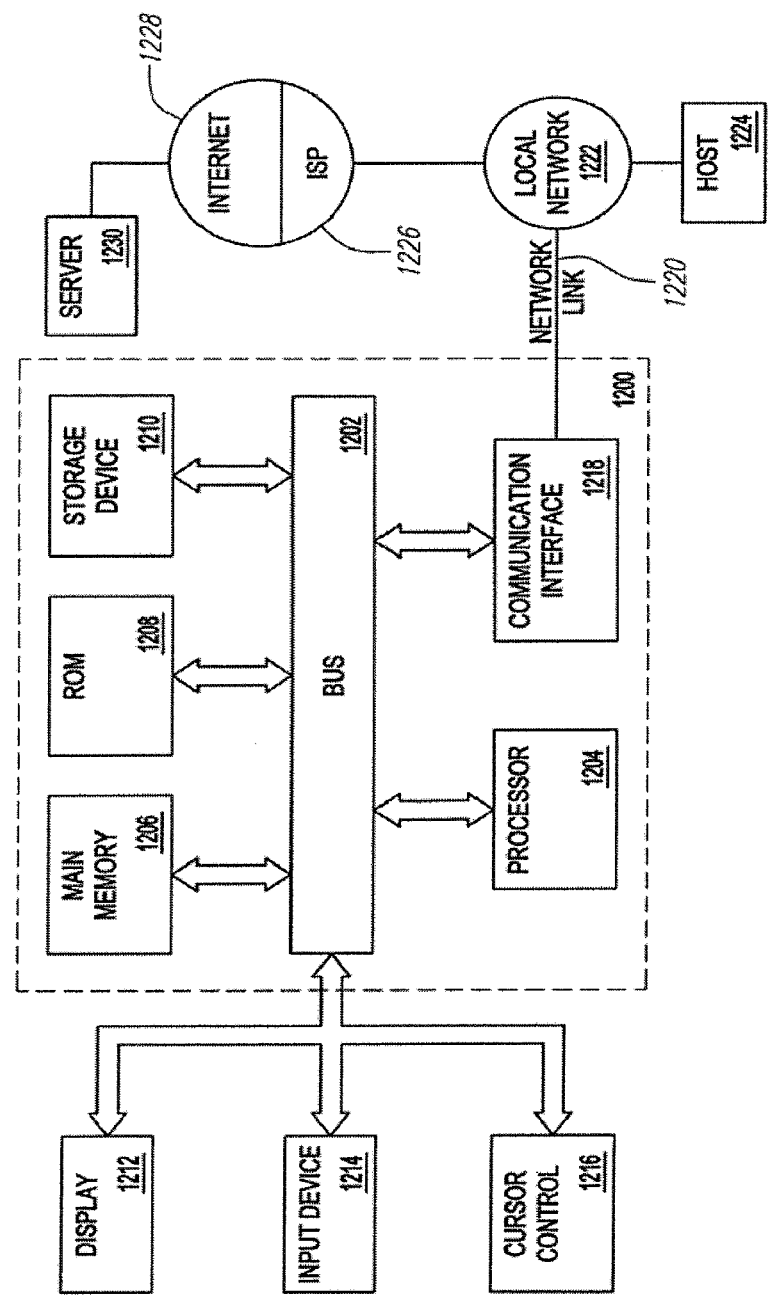
FIG. 12 is a block diagram of a system upon which an embodiment of the system security approaches may be implemented.

FIG. 12 is a block diagram that illustrates a computer system 1200 upon which an embodiment of the system security approaches may be implemented. Computer system 1200 includes a bus 1202 or other communication mechanism for communicating information, and a processor 1204 coupled with bus 1202 for processing information. Computer system 1200 also includes a main memory 1206, such as a random access memory ("RAM") or other dynamic storage device, coupled to bus 1202 for storing information and instructions to be executed by processor 1204. Main memory 1206 also may be used for storing temporary variables or other intermediate information during execution of instructions to be executed by processor 1204. Other on-chip memory modules, such as caches, are not shown in the figure but can also be used for temporary storage. Computer system 1200 further includes a read only memory ("ROM") 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 702 to a display 1212 for displaying information to a computer user. An input device 1214, including alphanumeric and other keys, is coupled to bus 1202 for communicating information and command selections to processor 1204. Another type of user input device is cursor control 1216, such as a mouse, trackball, stylus, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

According to one embodiment of the system security approaches, the approaches are provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions to computer system 1200. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 722. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider ("ISP") 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Figure 13:
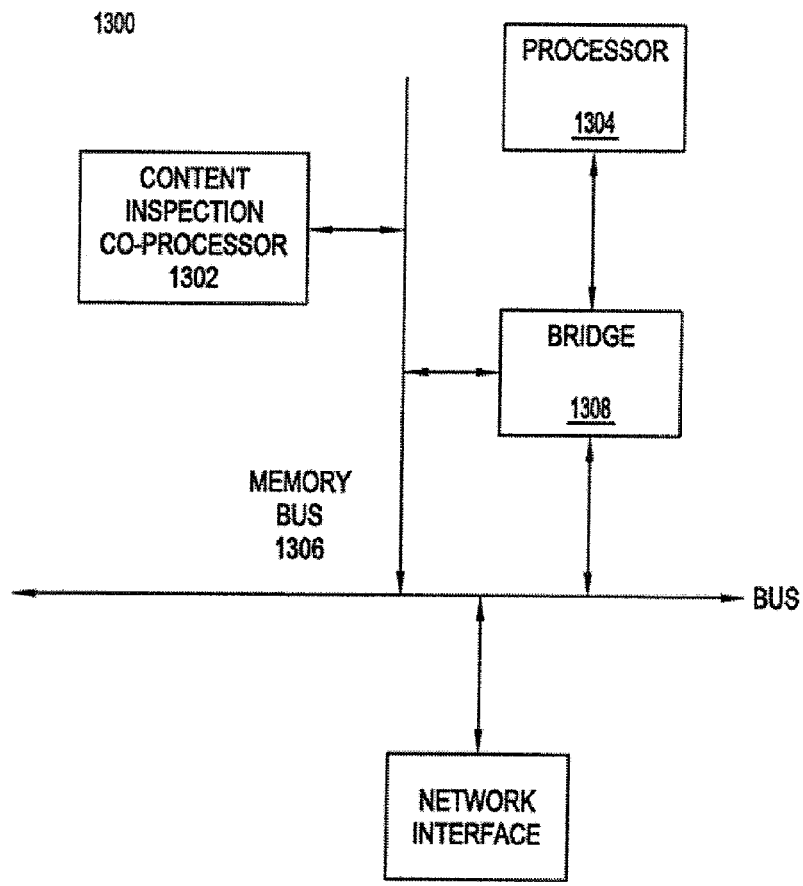
FIG. 13 is a block diagram of another system upon which an embodiment of the system security approaches may be implemented.

FIG. 13 is a block diagram that illustrates another system 1300 upon which an embodiment of the system security approaches may be implemented. Specifically, system 1300 includes a separate processing unit, content inspection co-processor ("CICP") 1302, which dedicates to perform the various system security approaches as discussed above. CICP can be implemented as an application-specific integrated circuit ("ASIC"), programmed in a programmable logic device, or even as a functional unit in a system-on-chip ("SOC"). In one implementation, CICP 1302 communicates with processor 1304 via bridge 1308 and memory bus 1306. Alternatively, CICP 1302 can communicate directly with processor 1304 (not shown in FIG. 13), if processor 1304 provides appropriate interfaces for such communication.

Processor 1304 can either be a general purpose processor or a specific purpose processor. Some examples of a specific purpose processor are processors that are designed for, without limitation, signal processing, mobile computing, and multimedia related applications. Specific purpose processors often include interfaces that other external units can directly connect. For instance, such a specific purpose processor may include one or more memory interfaces that either various types of memories can connect to or a co-processing unit, such as CICP 1302 can connect to.

Various types of memory modules can be coupled to memory bus 1306 or CICP 1302 to provide temporary storage for CICP 1302 or processor 1304. Some examples include various types of RAM and flash memory. Additionally, one or more of the components illustrated in FIG. 13 can be added (e.g., display device), combined (e.g., CICP 1302 and processor 1304 can reside on one SOC), or further divided (e.g., bridge 1308 can be further divided into a processor bridge, a bus controller, and a memory controller) and still remain within the claimed scope of the system security approaches.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of inspecting a plurality of data units received by a computing device, comprising:
    configuring a processing unit of said computing device to convert a plurality of patterns into a regular expression;
    split said regular expression into a first sub-expression and a second sub-expression;
    formulate a first deterministic finite automaton (DFA) from said first sub-expression with a first initial state and a first final state;
    formulate a second DFA from said second sub-expression with a second initial state and a second final state;
    construct a dependency relationship between said first DFA and said second DFA;
    identify a first suspected data unit and a second suspected data unit out of said plurality of said data units, wherein a first content of said first suspected data unit and a second content of said second suspected data unit collectively match any of said plurality of said patterns represented by said first DFA and said second DFA that are arranged in a sequence based on said dependency relationship; and
    perform an action based on a result of said identifying a first suspected data unit and a second suspected data unit.

2. The method as recited in claim 1, further comprising configuring said processing unit to temporarily retain said first suspected data unit after said first content of said first suspected data unit matches a code segment of a first pattern out of said plurality of said patterns until said first content of said first suspected data unit and said second content of said second suspected data unit collectively match said first pattern.

3. The method as recited in claim 1, further comprising configuring said processing unit to block said first suspected data unit, said second suspected data unit, or said first suspected data unit and said second suspected data unit from reaching their destinations.

4. The method as recited in claim 1, further comprising configuring said processing unit to make said result known.

5. The method as recited in claim 1, wherein said data units are packets with sequencing information.

6. The method as recited in claim 5, further comprising configuring said processing unit to arrange said plurality of said data units in a sequence according to said sequencing information prior to identifying said first suspected data unit and said second suspected data unit out of said plurality of said data units.

7. The method as recited in claim 1, further comprising configuring said processing unit to obtain said patterns from an external entity.

8. The method as recited in claim 1, further comprising configuring said processing unit to retain a comparison result after said first content of said first suspected data unit matches a code segment of a first pattern out of said plurality of said patterns.

9. A computer-readable medium containing one or more sequences of instructions configured to ensure system security, which instructions, when executed by one or more processors, cause the one or more processors to:
  split a regular expression that corresponds to a plurality of patterns into a first sub-expression and a second plurality of sub-expression;
  formulate a first deterministic finite automaton (DFA) from said first sub-expression with a first initial state and a first final state;
  formulate a second DFA from said second sub-expression with a second initial state and a second final state;
  construct a dependency relationship between said first DFA and said second DFA;
  insert a state in between said first DFA and said second DFA upon identifying an overlapped portion between said first DFA and said second DFA;
  formulate a third DFA by merging said first DFA, said second DFA, and optionally said state;
  identify a set of suspected data units out of said plurality of said data units, wherein the content of said set of said suspected data units collectively matches any of said plurality of said patterns represented by said third DFA; and
  perform an action based on a result of said identifying of a set of suspected data units.

10. The computer-readable medium as recited in claim 9, further comprising instructions which, when executed by the one or more processors, cause the one or more processors to retain said suspected data units in temporary storage while comparing the content of each of said suspected data units to any part of said patterns.

11. The computer-readable medium as recited in claim 9, further comprising instructions which, when executed by the one or more processors, cause the one or more processors to block said set of said suspected data units from reaching their destinations.

12. The computer-readable medium as recited in claim 9, further comprising instructions which, when executed by the one or more processors, cause the one or more processors to make said result known.

13. The computer-readable medium as recited in claim 9, wherein said data units are packets with sequencing information.

14. The computer-readable medium as recited in claim 13, further comprising instructions which, when executed by the one or more processors, cause the one or more processors to arrange said plurality of said packets in a sequence according to said sequencing information contained in said data units prior to identifying said set of suspected data units out of said plurality of said data units.

15. The computer-readable medium as recited in claim 9, wherein said patterns are obtained from an external entity.

16. The computer-readable medium as recited in claim 9, further comprising instructions which, when executed by the one or more processors, cause the one or more processors to retain a comparison result after the content of a first data unit matches a code segment of a first pattern out of said plurality of said patterns.

17. A method of ensuring system security of a computing device, comprising:
  configuring a processing unit of said computing device to
  split a regular expression that corresponds to a plurality of patterns into a first sub-expression and a second sub-expression;
  formulate a first deterministic finite automaton (DFA) from said first sub-expression with a first initial state and a first final state;
  formulate a second DFA from said second sub-expression with a second initial state-and a second final state;
  construct a dependency relationship between said first DFA and said second DFA;
  insert a state in between said first DFA and said second DFA upon identifying an overlapped portion between said first DFA and said second DFA;
  formulate a third DFA by merging said first DFA, said second DFA, and optionally said state;
  identify a set of suspected data units out of said plurality of said data units, wherein the content of said set of said suspected data units collectively matches any of said plurality of said patterns represented by said third DFA; and
  perform an action based on a result of said identifying of a set of suspected data units.

18. The method as recited in claim 17, further comprising configuring said processing unit to temporarily retain a first data unit out of said suspected data units after the content of said first data unit matches a code segment of a first pattern out of said plurality of said patterns until the content of said set of said suspected data units collectively matches said first pattern.

19. The method as recited in claim 17, further comprising configuring said processing unit to block said set of said suspected data units from reaching their destinations.

20. The method as recited in claim 17, further comprising making said result known.

21. The method as recited in claim 17, further comprising configuring said processing unit to arrange said plurality of said data units in a sequence according to sequencing information contained in said data units prior to identifying said set of suspected data units out of said plurality of said data units.

22. The method as recited in claim 17, further comprising configuring said processing unit to retain a comparison result after the content of a first data unit matches a code segment of a first pattern out of said plurality of said patterns.

23. A system configured to ensure system security, comprising:
  a processing means for
    splitting a regular expression that corresponds to a plurality of patterns into a first sub-expression and a second sub-expression;
    formulating a first deterministic finite automaton (DFA) from said first sub-expression with a first initial state and a first final state;
    formulating a second DFA from said second sub-expression with a second initial state and a second final state;
    constructing a dependency relationship between said first DFA and said second DFA;

inserting a state in between said first DFA and said second DFA upon identifying an overlapped portion between said first DFA and said second DFA;

formulating a third DFA by merging said first DFA, said second DFA, and optionally said state;

identifying a set of suspected data units out of said plurality of said data units, wherein the content of said set of said suspected data units collectively matches any of said plurality of said patterns represented by said third DFA; and performing an action based on a result of said identifying of a set of suspected data units.

24. The system as recited in claim 23, further comprising a storage means for temporarily retaining a first data unit out of said suspected data units after the content of said first data unit matches a code segment of a first pattern out of said plurality of said patterns until the content of said set of said suspected data units collectively matches said first pattern.

25. The system as recited in claim 23, wherein said processing means is further configured for:

arranging said plurality of said data units in a sequence according to sequencing information contained in said data units prior to identifying said set of suspected data units out of said plurality of said data units.

26. The system as recited in claim 23, further comprising:

a storage means for retaining a comparison result after the content of a first data unit matches a code segment of a first pattern out of said plurality of said patterns.

27. A system configured to detect and prevent intrusion, comprising:

a processing means for
splitting a regular expression that corresponds to a plurality of patterns into a first sub-expression and a second sub-expression;
formulating a first deterministic finite automaton (DFA) from said first sub-expression with a first initial state and a first final state;
formulating a second DFA from said second sub-expression with a second initial state and a second final state;
constructing a dependency relationship between said first DFA and said second DFA;
identifying a first suspected data unit and a second suspected data unit out of said plurality of said data units, wherein a first content of said first suspected data unit and a second content of said second suspected data unit collectively match any of said plurality of said patterns represented by said first DFA and said second DFA that are arranged in a sequence based on said dependency relationship; and
performing an action based on a result of said identifying a first suspected data unit and a second suspected data unit.

28. The system as recited in claim 27, further comprising a storage means for temporarily retaining said first suspected data unit after said first content of said first suspected data unit matches a code segment of a first pattern out of said plurality of said patterns until said first content of said first suspected data unit and said second content of said second suspected data unit collectively match said first pattern.

29. The system as recited in claim 27, wherein said processing means is further configured for:

arranging said plurality of said data units in a sequence according to sequencing information contained in said plurality of said data units prior to identifying said first suspected data unit and said second suspected data unit out of said plurality of said data units.

30. The system as recited in claim 27, further comprising:

a storage means for retaining a comparison result after said first content of said first suspected data unit matches a code segment of a first pattern out of said plurality of said patterns.

31. A system configured to ensure system security, comprising:

a processor,
a bus, coupled to said processor,
a communication interface, coupled to said bus, wherein said communication interface receives a plurality of data units,
a main memory, coupled to the bus, wherein said memory includes instructions when executed by said processor, causes said processor to:
split a regular expression that corresponds to a plurality of patterns into a first sub-expression and a second sub-expression;
formulate a first deterministic finite automaton (DFA) from said first sub-expression with a first initial state and a first final state;
formulate a second DFA from said second sub-expression with a second initial state and a second final state;
construct a dependency relationship between said first DFA and said second DFA;
insert a state in between said first DFA and said second DFA upon identifying an overlapped portion between said first DFA and said second DFA;
formulate a third DFA by merging said first DFA, said second DFA, and optionally said state;
identify a set of suspected data units out of said plurality of said data units, wherein the content of said set of said suspected data units collectively matches any of said plurality of said patterns represented by said third DFA; and
perform an action based on a result of said identifying of a set of suspected data units.

32. The system as recited in claim 31, wherein a temporary storage temporarily retains a first data unit out of said suspected data units after the content of said first data unit matches a code segment of a first pattern out of said plurality of said patterns until the content of said set of said suspected data units collectively matches said first pattern.

33. The system as recited in claim 31, wherein said processor further:

arranges said plurality of said data units in a sequence according to sequencing information contained in said data units prior to identifying said set of suspected data units out of said plurality of said data units.

34. The system as recited in claim 31, wherein a temporary storage retains a comparison result after the content of a first data unit matches a code segment of a first pattern out of said plurality of said patterns.

35. A system configured to detect and prevent intrusion, comprising:

a processor,
a bus, coupled to said processor,
a communication interface, coupled to said bus, wherein said communication interface receives a plurality of data units,
a main memory, coupled to the bus, wherein said memory includes instructions that when executed by said processor, cause said processor to:
split a regular expression that corresponds to a plurality of patterns into a first sub-expression and a second sub-expression;

formulate a first deterministic finite automaton (DFA) from said first sub-expression with a first initial state and a first final state;

formulate a second DFA from said second sub-expression with a second initial state and a second final state;

construct a dependency relationship between said first DFA and said second DFA;

identify a first suspected data unit and a second suspected data unit out of said plurality of said data units, wherein a first content of said first suspected data unit and a second content of said second suspected data unit collectively match any of said plurality of said patterns represented by said first DFA and said second DFA that are arranged in a sequence based on said dependency relationship; and perform an action based on a result of said identifying a first suspected data unit and a second suspected data unit.

36. The system as recited in claim 35, wherein a temporary storage retains said first suspected data unit after said first content of said first suspected data unit matches a code segment of a first pattern out of said plurality of said patterns until said first content of said first suspected data unit and said second content of said second suspected data unit collectively match said first pattern.

37. The system as recited in claim 35, wherein said processor:

arranges said plurality of said data units in a sequence according to sequencing information contained in said plurality of said data units prior to identifying said first suspected data unit and said second suspected data unit out of said plurality of said data units.

38. The system as recited in claim 35, wherein a temporary storage retains a comparison result after said first content of said first suspected data unit matches a code segment of a first pattern out of said plurality of said patterns.

39. A system, comprising:

a processor, and a co-processor unit, electrically coupled to said processor, wherein said co-processor unit is configured to:

split a regular expression that corresponds to a plurality of patterns into a first sub-expression and a second sub-expression;

formulate a first deterministic finite automaton (DFA) from said first sub-expression with a first initial state and a first final state;

formulate a second DFA from said second sub-expression with a second initial state and a second final state;

construct a dependency relationship between said first DFA and said second DFA;

insert a state in between said first DFA and said second DFA upon identifying an overlapped portion between said first DFA and said second DFA;

formulate a third DFA by merging said first DFA, said second DFA, and optionally said state;

identify a set of suspected data units out of said plurality of said data units, wherein the content of said set of said suspected data units collectively matches any of said plurality of said patterns represented by said DFA; and perform an action based on a result of said identifying of a set of suspected data units.

40. The system as recited in claim 39, wherein a temporary storage retains a first data unit out of said suspected data units after the content of said first data unit matches a code segment of a first pattern out of said plurality of said patterns until the content of said set of said suspected data units collectively matches said first pattern.

41. The system as recited in claim 39, wherein said co-processor unit farther:

arranges said plurality of said data units in a sequence according to sequencing information contained in said data units prior to identifying said set of suspected data units out of said plurality of said data units.

42. The system as recited in claim 39, wherein a temporary storage retains a comparison result after the content of a first data unit matches a code segment of a first pattern out of said plurality of said patterns.

43. A system, comprising:

a processor, and a co-processor unit, electrically coupled to said processor, wherein said co-processor unit is configured to:

split a regular expression that corresponds to a plurality of patterns into a first sub-expression and a second sub-expression;

formulate a first deterministic finite automaton (DFA) from said first sub-expression with a first initial state and a first final state;

formulate a second DFA from said second sub-expression with a second initial state and a second final state;

construct a dependency relationship between said first DFA and said second DFA;

identify a first suspected data unit and a second suspected data unit out of said plurality of said data units, wherein a first content of said first suspected data unit and a second content of said second suspected data unit collectively match any of said plurality of said patterns represented by said first DFA and said second DFA that are arranged in a sequence based on said dependency relationship; and perform an action based on a result of said identifying a first suspected data unit and a second suspected data unit.

44. The system as recited in claim 43, wherein a temporary storage retains said first suspected data unit after said first content of said first suspected data unit matches a code segment of a first pattern out of said plurality of said patterns until said first content of said first suspected data unit and said second content of said second suspected data unit collectively match said first pattern.

45. The system as recited in claim 43, wherein said co-processor unit:

arranges said plurality of said data units in a sequence according to sequencing information contained in said plurality of said data units prior to identifying said first suspected data unit and said second suspected data unit out of said plurality of said data units.

46. The system as recited in claim 43, wherein a temporary storage retains a comparison result after said first content of said first suspected data unit matches a code segment of a first pattern out of said plurality of said patterns.

* * * * *